(12) United States Patent
Kuz et al.

(10) Patent No.: US 7,962,119 B2
(45) Date of Patent: Jun. 14, 2011

(54) SYSTEM FOR TRANSMITTING AN EMERGENCY CALL

(75) Inventors: Volker Kuz, Braunschweig (DE); Ralph Behrens, Schellerten (DE)

(73) Assignee: Harman Becker Automotive Systems GmbH, Karlsbad (DE)

( * ) Notice: Subject to any disclaimer, the term of this patent is extended or adjusted under 35 U.S.C. 154(b) by 307 days.

(21) Appl. No.: 11/521,586

(22) Filed: Sep. 14, 2006

(65) Prior Publication Data

US 2007/0066276 A1 Mar. 22, 2007

Related U.S. Application Data

(63) Continuation-in-part of application No. 10/563,069, filed on Jan. 29, 2007.

(51) Int. Cl.
*H04M 11/04* (2006.01)

(52) U.S. Cl. ................... 455/404.1; 455/404.2

(58) Field of Classification Search ........... 455/404.1
See application file for complete search history.

(56) References Cited

U.S. PATENT DOCUMENTS

| | | | | |
|---|---|---|---|---|
| 4,163,218 A * | 7/1979 | Wu | ........................ | 340/310.12 |
| 5,552,766 A * | 9/1996 | Lee et al. | ..................... | 340/541 |
| 6,154,658 A * | 11/2000 | Caci | ............................. | 455/466 |
| 6,310,543 B1 * | 10/2001 | Yoshioka et al. | ............. | 340/436 |
| 6,711,399 B1 * | 3/2004 | Granier | ...................... | 455/404.1 |
| 6,765,495 B1 * | 7/2004 | Dunning et al. | ............... | 340/903 |
| 6,996,092 B1 * | 2/2006 | Maguire et al. | ............... | 370/356 |
| 7,107,358 B2 * | 9/2006 | Vasko et al. | .................. | 709/249 |
| 2002/0055350 A1 | 5/2002 | Gupte et al. | ................... | 455/412 |
| 2003/0009550 A1 * | 1/2003 | Taylor et al. | ................... | 709/224 |
| 2003/0050039 A1 | 3/2003 | Baba et al. | | |
| 2004/0203652 A1 * | 10/2004 | Yan | ............................ | 455/414.1 |
| 2004/0227629 A1 * | 11/2004 | Adamczyk et al. | ...... | 340/539.18 |
| 2006/0052918 A1 * | 3/2006 | McLeod et al. | ................. | 701/29 |

FOREIGN PATENT DOCUMENTS

WO    WO 03/003327 A1    1/2003

* cited by examiner

*Primary Examiner* — Lester Kincaid
*Assistant Examiner* — Yu (Andy) Gu

(57) ABSTRACT

An emergency call system transmits an emergency call with emergency information from a vehicle using a communication system. The emergency call system includes an emergency call device that connects with an emergency assistance center during an emergency. The emergency call device may be automatically or manually triggered to transmit data and information related to an emergency to the assistance center. Data and information may be transmitted over a data connection and/or a voice connection over a hardwired or wireless network.

13 Claims, 7 Drawing Sheets

SYSTEM FOR TRANSMITTING AN EMERGENCY CALL

PRIORITY CLAIM

This application is a continuation-in-part application claiming priority to U.S. application Ser. No. 10/563,069 (11336/1240), filed Jan. 29, 2007, which claims priority to foreign application PCT/EP2004/007127 filed on Jun. 30, 2004, which claims priority to EP application EP 03 014 853.0 filed on Jun. 30, 2003, each of which are incorporated by reference herein.

BACKGROUND OF THE INVENTION

1. Technical Field

This application relates to an emergency call device for transmitting an emergency call including emergency information using a communication system.

2. Related Art

Networked vehicles may interface smart, wireless networks and vehicle manufacturers may integrate wireless-based telematics services in their vehicles. Telematics may capitalize on the emergence and proliferation of sophisticated broadband wireless communications technology and e-commerce.

Emergency call (e-call) systems may be one example of a telematic service. An e-call system may connect vehicle occupants to an emergency service that receives information related to the vehicle, or other data related to the emergency. For an e-call system to be effective, it should be reliable and be triggered in an emergency quickly. Accordingly, there is a need for an e-call system for transmitting an emergency call, which increases the reliability of data transmission and may almost instantaneously transmit emergency related information.

SUMMARY OF THE INVENTION

An emergency call device may transmit an emergency call including emergency information from a vehicle using a mobile communication system. The emergency call system includes an emergency call device and an emergency call assistance center. The emergency call device is configured to transmit an emergency call including emergency information from a vehicle using a mobile communication system to an emergency call assistance center. The emergency call device may increase the reliability of data transmission. After an emergency call has been triggered at the vehicle, a data connection may be established with the emergency call assistance center via the mobile communication system. Emergency information is transmitted to the emergency call assistance center using the data connection. A first voice connection may be established with the emergency call assistance center through the mobile communication system. A dual tone multi-frequency (DTMF) message may be transmitted that includes emergency information through a voice connection.

The emergency call device may connect with the emergency call assistance center and/or an emergency call dispatch center while automatically reporting information including the vehicles position, the vehicle's identification number, or other data related to the emergency. The emergency call dispatch center may send appropriate help to the scene of the emergency based on the connection with the emergency call device and/or the emergency assistance center. Multiple connections may improve the reliability of the emergency call.

Other systems, methods, features and advantages of the invention will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE FIGURES

The system may be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION OF THE INVENTION

An emergency call system includes an emergency call device that may connect with an emergency assistance center. When an emergency occurs, the emergency call device may automatically or manually transmit data and information to the assistance center. The data transmission may be transmitted over one or more wireless protocols.

Figure 1:
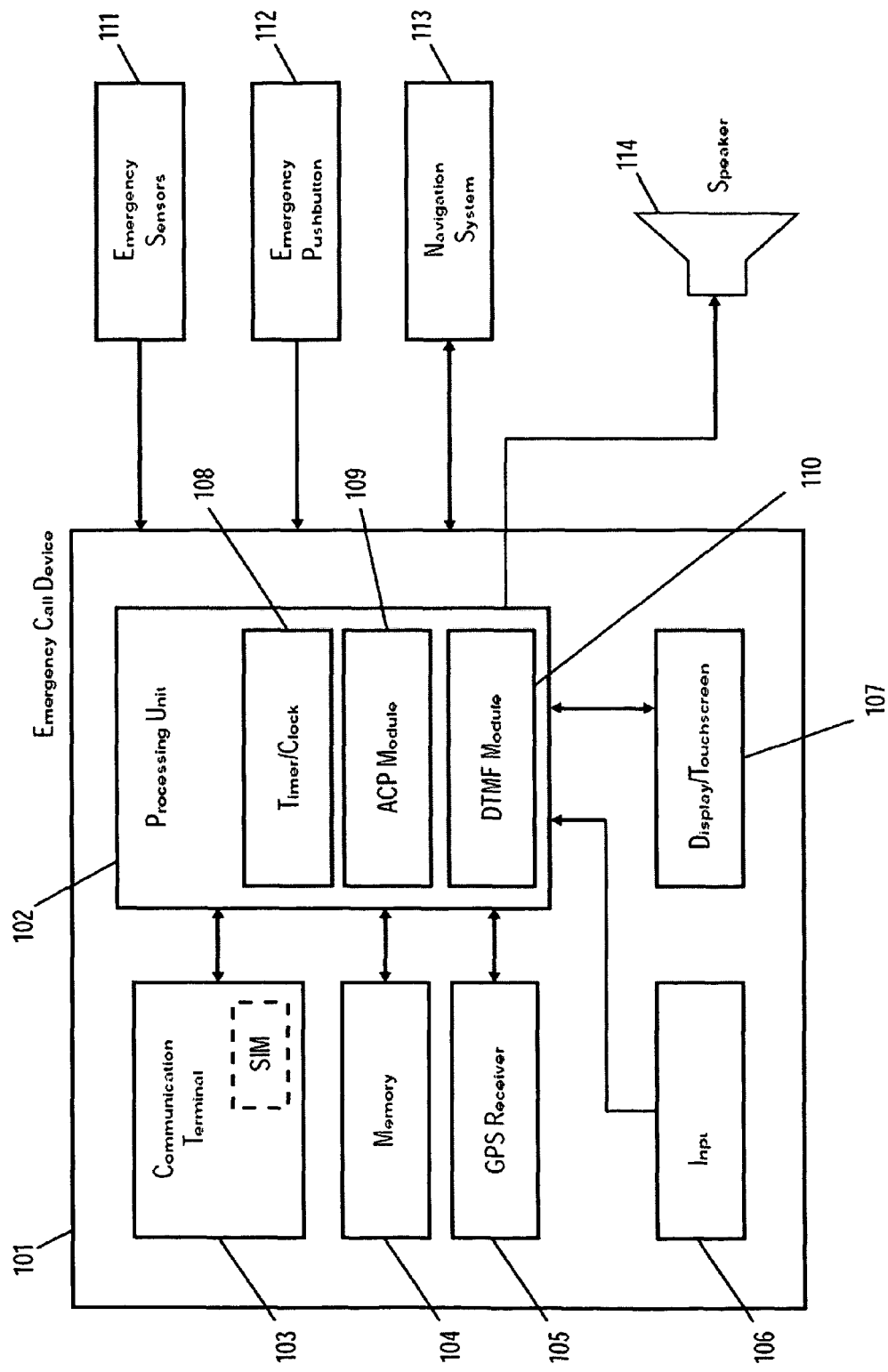
FIG. 1 is a diagram of an emergency call system.
Figure 9:
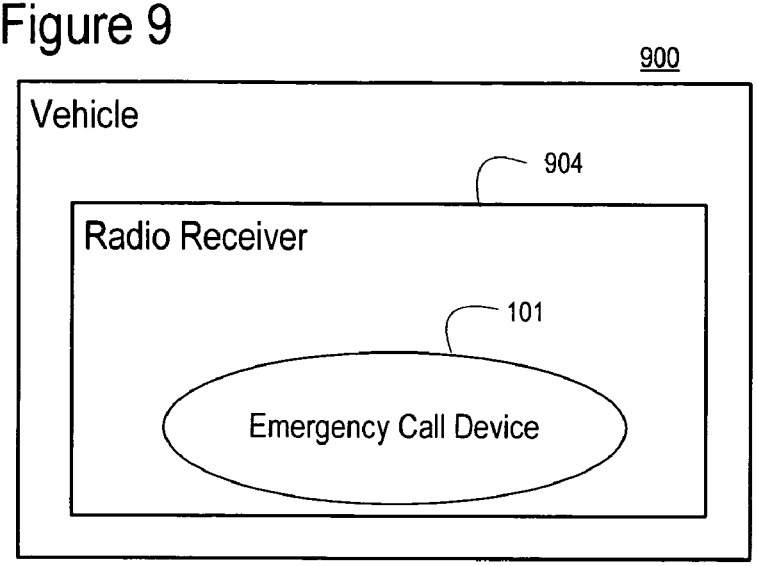
FIG. 9 is a diagram of one emergency call device.
Figure 10:
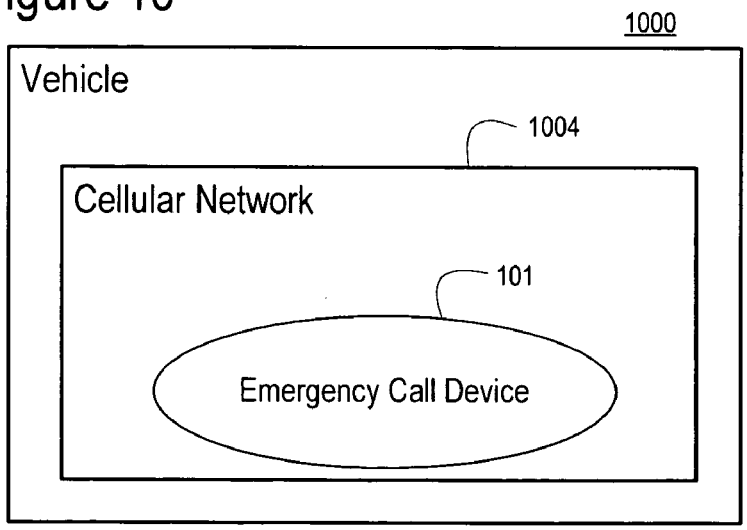
FIG. 10 is a diagram of another emergency call device.

FIG. 1 is a diagram of an emergency call system 100 having an emergency call device 101. The emergency call device 101 may be associated with a vehicle or other device or structure for transporting persons or things. In FIG. 9, the emergency call device 101 may be integrated in or may be a unitary part of a radio receiver 904 of a vehicle 900, or as shown in FIG. 10, may be integrated in or may be a unitary part of a cellular or wireless network 1004 in a vehicle 1000. In an alternative system, the emergency call device 101 may be associated with or may be a unitary part of audio, visual, or multimedia devices. Although not limited to a vehicle, the emergency call device 101 may be located within or may be a part of a vehicle.

Figure 6:
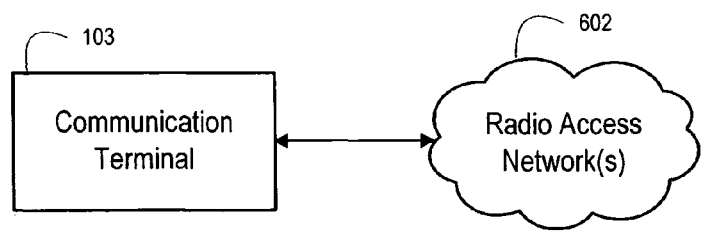
FIG. 6 is a diagram of an emergency call connection.

The emergency call device 101 includes a processing unit 102 for processing data output and/or input. The data may be related to the occupants or the vehicle itself and may include a system that tracks position by processing two or more separate coded signals. Some data may be received from a global positioning system (GPS) or a differential global positioning system. In FIG. 6, a communication terminal 103 provides connectivity to one or more radio access networks 602. A radio access network 602 may offer telematics services and/or provide data and voice communication, that may be integrated within or is a unitary part of the emergency call device 101. Alternatively, the communication terminal 103 may connect to publicly distributed or privately distributed networks, such as the Internet to establish voice connection and/or a data connection. The networks may use one or more wireless protocols, such as Bluetooth®, 802.11b, 802.11j, 802.11x, Zigbee, Ultra Wide Band, Mobile FI, Wireless Local Area Network ("WLAN"), and/or Infrared Data Transmissions which may include the Infrared Data Association IrDa 1.0 standard which may provide high transfer rates, or the Infrared Data Association IrDa 1.1 standard which may provide higher transfer rates.

The communication terminal 103 may comprise a computing device that connects with a network, such as a cellular transceiver or phone. A device where information can be written to or retrieved from or a memory 104 may store intermediate data such as a GPS data and/or location history in the emergency call device 101. It may be stored with attributes of the data for ease and speed of search and retrieval. Some systems store the data with logic or operations for searching, sorting, recombining, and other functions. The location history may include information and/or events related to the actions of the vehicle or occupant prior to, during, and/or after the emergency. In a car accident a memory may store data related to the speed, braking, steering wheel, tire rotation, transmission and other data that occurred prior to, during, and/or after the accident. In some systems the information is related in a database or relational database.

A GPS history that may be transmitted may include information on the vehicle's location, such as the route taken in the time frame before or near the emergency call. The transmitted data may be processed at an emergency call assistance center 401 (FIG. 4) and the result may be heard or displayed. The display may generate an on-screen map that may comprise longitudes, and/or latitudes that is transmitted to an assistant handling the emergency call. A GPS history or a history common to a driver or vehicle may provide vehicle related data, such as a vehicle identification number, license plate, registration, and/or insurance, etc. The processed history may include data related to the occupant, such as name, address, medical information, blood type, family contact, and/or doctor's name, etc. The history may indicate the driving direction before the emergency occurred, the rate of deceleration that may suggest an emergency braking situation, and/or any atypical steering before the emergency. Some data may identify black ice, slush, aquaplaning, etc. The history may be used to determine the cause of the emergency, in addition to providing information that emergency service personnel may use to assist those involved.

The GPS history and other history may be continuously logged or tracked by the emergency call device 101 using data obtained from various emergency sensors 111 and/or the navigation system 113. The history may contain information about the last five minutes of the route taken by the occupant of the vehicle prior to triggering the emergency call with updates about a predetermined interval such as about every 30 seconds. The time periods for the recorded data may also vary. A position determining device, such as GPS receiver 105 may obtain the current position of the vehicle for navigation purposes or for reporting the vehicle's location in case of an emergency.

The emergency call device may include an input/interface 106 and an output interface such as a display/touchscreen 107. Alternatively, the input 106 or the output may comprise a keyboard, pushbuttons, speaker(s), a display/touch-screen, etc. The input 106 or output 107 may allow an occupant of the vehicle to interact with the emergency call device 101. Communication may occur during emergencies and during non-emergencies. The occupant may want to cancel an emergency call, or the occupant may want to provide additional information. The occupant may also receive information about the status of the emergency call that may indicate when help may arrive.

The emergency call device 101 may communicate with Dual Tone Multi-Frequency (DTMF) or Application Communication Protocol (ACP) messages. Alternatively, other messaging or communication systems may be used. To transmit DTMF, ACP messages, or messages according to other communication protocols, the device may include a DTMF module 110 and an ACP module 109, or a conversion device. The DTMF module 110 and an ACP module 109 may communicate in DTMF or ACP protocols, respectively.

The article "Telematics: safe and fun driving" by Yilin Zhao, IEEE Intelligent Systems (Vol. 17), 2002, which is incorporated by reference herein, provides an overview of some emergency call systems. The systems may use protocols such as the Application Communication Protocol (ACP), the Global Automotive Telematics Standard (GATS), and the Motorola Emergency Messaging System (MEMS). These protocols may be used to transmit e-calls through various analog and digital networks including but not limited to Ethernet, Digital Subscriber Lines ("DSL"), Plain Old Telephone Service ("POTS"), Cellular Digital Packet Data ("CDPD"), Code Division Multiple Access ("CDMA"), Global System for Mobile communication ("GSM"), 802.11, Universal Mobile Telecommunications System ("UMTS"), Advanced Mobile Phone System ("AMPS"), General Packet Radio Service ("GPRS"), and Satellite links., etc. Messaging services such as the Short Message Service ("SMS") may also be used for transmitting information. Some systems use alternate protocols such as 802.11b, 802.11j, 802.11g, ZigBee, Ultra Wide Band, Mobile FI, or other wireless protocols.

Figure 3:
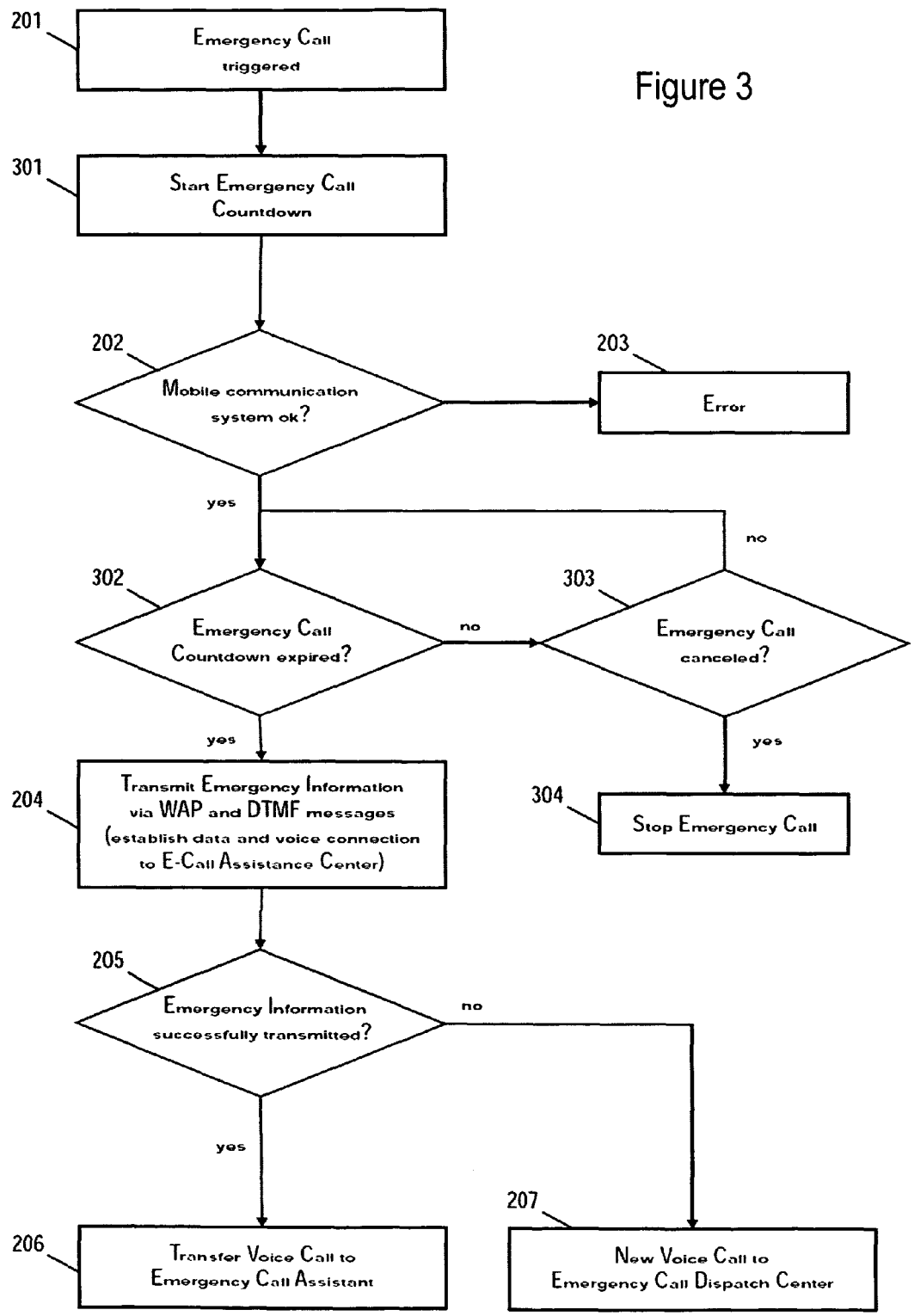
FIG. 3 is a flow chart of an alternate emergency call procedure.

The processing unit 102 may include a timer/clock 108, which may control delays (e.g. countdowns) and/or provide the current time or time stamp information. In FIG. 3, a countdown may be used to delay the placement of an emergency call. In some instances, the delay may allow an occupant of the vehicle to cancel the emergency call, such as when calls are triggered by accident or by error. The timer/clock 108 may be used to timestamp data, such as messages communicated through the communication terminal 103 to a receiving entity.

The emergency call device 101 may be connected to one or several powertrain sensors or emergency sensors 111 that may detect and in some instances, identify an emergency. The emergency sensors 111 may transmit relevant information, and some may recognize an emergency. The emergency sensors 111 may trigger an emergency call automatically or may be coupled with a user activation device such as an emergency pushbutton 112 that may be manually activated. An emergency may comprise a vehicle emergency, occupant emergency, a request for assistance, or conditions that do not require urgent assistance.

In one system, a Subscriber Identity Module ("SIM") may be operationally coupled to communication terminal 103 to identify the subscriber of the communication terminal 103 to a communication network. In an alternate system, the communication systems dispatch centers for emergency calls may be contacted without a SIM card. The emergency call dispatch centers may be available, for example, by dialing a numerical code (such as 112 in Europe or 911 in the United States of America).

The communication terminal 103 may be capable of establishing data connections using a Wireless Application Protocol ("WAP") protocol or other protocol stack and data formats for a physical layer up to and including a session layer. WAP-enabled browsers on the application layer may be used to request, transmit, and receive data. The data, such as the emergency related information that may be transmitted to an emergency call assistance center 401, may be appended to an emergency call uniform resource locator ("URL") that may be transmitted to the emergency call assistance center 401.

An example for an emergency call URL that may be contacted during an emergency is: http://emergency.harmanbecker.de/emergency-assistance.jsp? <emergency information>. At this address, the emergency call assistance center 401 may be contacted at http://emergency.harman-becker.de/emergency-assistance.jsp while the emergency data that is provided to the assistance center 401 may be appended after the question mark ("?") as indicated by <emergency information>. This communication protocol represents one form of communication that the emergency call device 101 may make. The emergency data transmitted to the emergency call assistance center 401 may be formatted using many protocols or combinations of protocols that may include ACP, GATS or MEMS or other proprietary formats. In one system, the formatted emergency information may be transmitted using WML/HTML data transfer as shown in the exemplary emergency call URL.

The transfer of information through the WAP protocol may provide a substantially instantaneous or near real-time delivery of the data to the assistance center 401 (which may not be configured for SMS messages). In addition, the transfer through the WAP protocol may result in less payload restrictions and may also overcome a potential coverage limitation.

The DTMF module may be integrated within or may be a unitary part of an emergency call device 101 to format the emergency information for transmission through a voice connection. The time required to transfer data through DTMF may be related to the data size transmitted. Less data may be sent at quicker transfer rates. Each DTMF tone may identify a character and may last approximately 100 milliseconds long. A DTMF transfer may process less data in forming emergency information compared with transmitting emergency information via a data connection such as a WAP connection.

The emergency information transmitted through a voice connection using DTMF may include a vehicle's current position, such as longitude and latitude, and a phone number of the transmitting communication terminal 103. The format in which the emergency information in the DTMF format may be transmitted may be about a 70 digit WGS84 coded longitude followed by about a 10 digit WGS84 coded latitude in addition to the telephone number of the transmitting communication terminal 103. One format may be: 0012347120 *034523490 00491724871000.

The spaces shown are included to illustrate the location of the three parameters in the DTMF message. The first digit of the longitude and latitude may comprise a 0 character if the parameter is a positive number or a * character if it comprises a negative number. The international prefix 0049 of the phone number may be expressed as +49. Before sending a DTMF message comprising the emergency information, it may be desirable to delay the transmission. A delay may be needed after connection with the emergency call assistance center 401 to ensure that the emergency information is accurately received.

Figure 2:
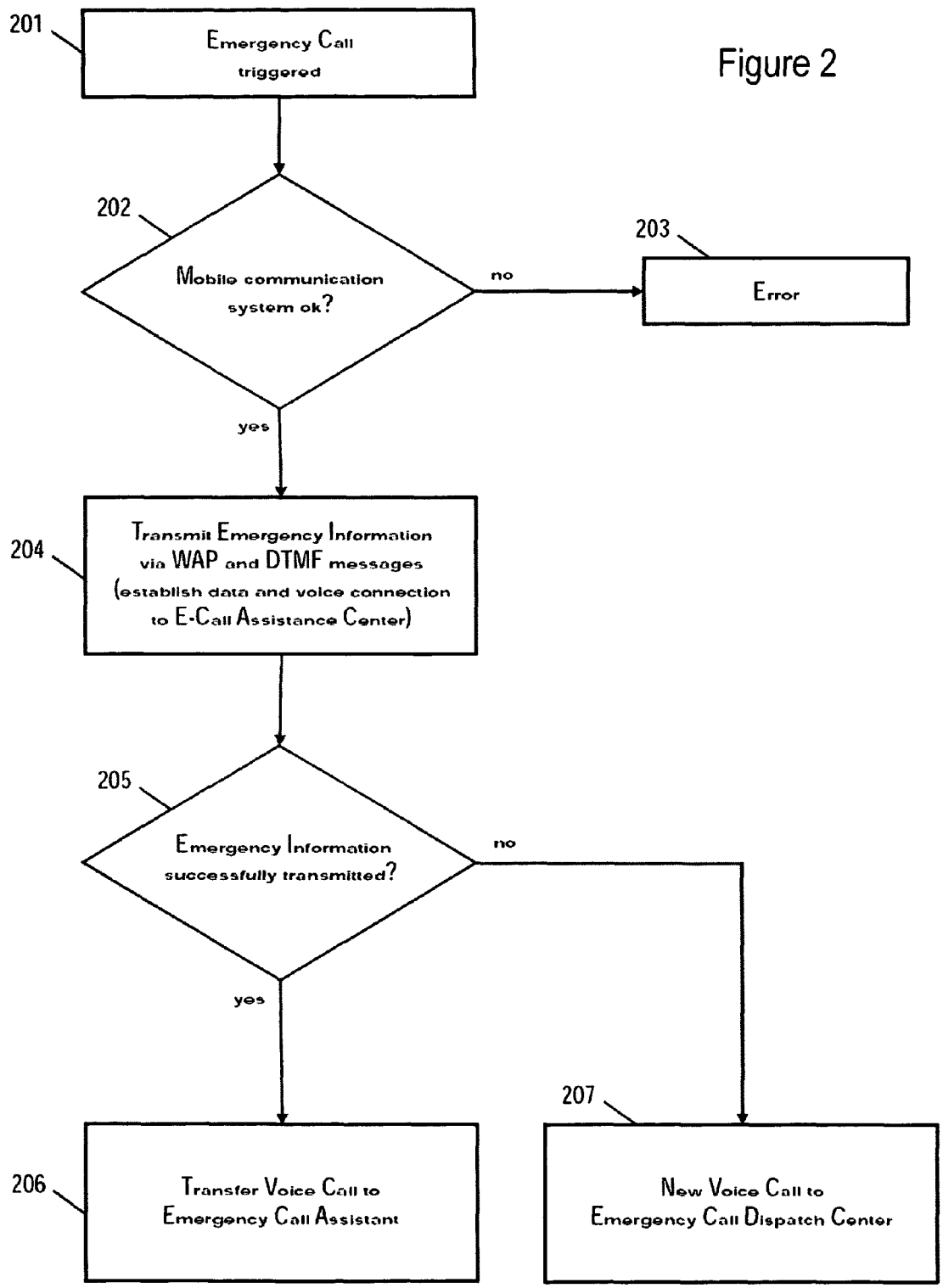
FIG. 2 is a flow chart of an emergency call procedure.

FIG. 2 is a flow chart of one emergency call procedure. An emergency call in block 201, may be triggered manually or automatically. In block 202, the device transmitting the emergency call may test the availability of the communication system. If the communication terminal 103 in the device has been damaged or no communication network is available, an error message may be generated and displayed or transmitted in block 203 and an emergency call may not be made. If a SIM card is used and the communication terminal 103 is damaged, some systems may transmit an emergency call by contacting an emergency call dispatch center 401 by dialing a multiple numbers directory.

If the communication terminal 103 or phone is not damaged and a communication network may be accessed, the device may transmit emergency information as in block 204 to the emergency call assistance center 401. The device may establish a data connection, such as a WAP connection, to the emergency call assistance center 401. Next, the device may gather the relevant information that may be transmitted to the emergency call assistance center 401. The emergency information may be part of an emergency call message according to the emergency call message protocol of ACP. The emergency call message may be transmitted to the emergency call assistance center 401. It may include a URL to make the data connection. In the request, the emergency information may be transmitted to an assistant handling the emergency call at the emergency call assistance center 401. The assistant may be a device or operator handling and processing the emergency information.

In one emergency call message protocol, the receiving side, or the emergency call assistance center 401, may acknowledge the reception of the emergency information through an emergency call reply message. After transmitting the emergency information through a data connection, the connection may be broken. Next, the emergency call device 101 may establish a voice connection to the emergency call assistance center 401 to transmit emergency information using a DTMF message. The emergency information transmitted to the emergency call assistance center 401 using a DTMF message may comprise redundant information to the emergency information transmitted using the data connection and may be formatted as explained above. A back-up protocol may enhance the reliability of the transmission of emergency information by transmitting emergency information according to a data connection and a messaging protocol or voice connection.

Some alternate systems may synchronize the emergency information received through the data connection and the voice connection at the emergency call assistance center 401. The synchronization and a compensation may correct the information or add information. The emergency call assistance center 401 may recognize emergency information that may have been received through a WAP connection or through a voice connection (such as a DTMF message) belonging to the same emergency call. In both situations, an the identification number (e.g. International Mobile Equipment Identification (IMEI)) of the emergency call transmitting terminal is communicated and/or is known to the emergency assistance center 401.

In situations in which the emergency information has been successfully transmitted as in block 205, the emergency call device 101 may use the established connection to transmit a DTMF message, a persistent connection may allow further interaction between an occupant of the vehicle and the assistance center 401. The end of a DTMF message may be detected at the emergency call assistance center 401 and the established voice call may be transferred (as in block 206) to an assistant serving the emergency call at the emergency call assistance center 401.

Figure 7:
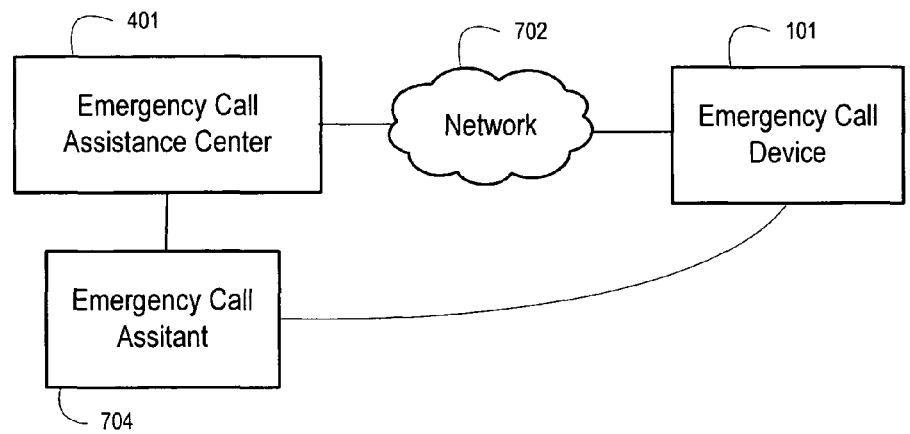
FIG. 7 is a diagram of an alternate emergency call system.

The emergency call system of FIG. 7 includes an emergency call device 101 coupled with the emergency call assistance center 401 through a network 702. The network 702 may comprise a publicly distributed or privately distributed network. The emergency call assistance center 401 may comprise a third party device configured to receive data including audio or visual data related to emergency calls. Alternatively, the emergency call assistance center 401 may be associated with a hospital to provide immediate help in case of injuries in a vehicle accident. The emergency call assistance center 401 may include a plurality of emergency call assistants 704. The emergency call device 101 may be coupled to an emergency call assistant 704. The emergency call assistant 704 may handle or re-route the emergency request by establishing a data and/or voice connection with the emergency call device 101. In one system, the emergency call assistant 704 may comprise an operator module with the emergency call assistance center 401 that receives calls and requests and reviews data related to the emergency.

In FIG. 2, the number of characters transmitted in the DTMF message is known as is the duration of character transmissions. In some systems, the voice call may be transferred to an assistant after a time period T of: T=(number of characters)×x(duration of a character (about 100 ms)). To ensure the DTMF message may have been transmitted, the transfer may be performed after expiration of the time period T plus an additional securing time interval, such as about 1 to about 2 seconds in length. This time period may be used to inform an occupant of the arrival time of emergency assistance, and may be used to transmit further information relevant for the emergency call assistance center 401. Alternatively, the emergency call device 101 in the vehicle may establish another voice connection to the emergency call assistance center 401 to allow interaction between the assistant and an occupant of the vehicle.

When an error occurs during transmission of the emergency information and the emergency information is not successfully transmitted to the emergency call assistance center 401, the device may recognize the failure during data transmission and connect an occupant of the vehicle to an emergency call dispatch center 402 directly through a voice connection as in block 207. The emergency call device 101 may automatically dial a pre-programmed emergency number 207 of a dispatch center 402 such as 112 in Europe or 911 in the United States or another emergency assistance number. The connection to an emergency call dispatch may be desirable when no emergency information has been transmitted to the emergency call assistance center 401. Without emergency information the assistance center 401 may not be able to provide useful services to the emergency caller. Accordingly, a connection to the emergency call dispatch center 402 may improve reliability. In alternate systems, the connection with the emergency call dispatch center 402 may supplement the data or information that may be transmitted to the emergency call assistance center 401.

Figure 8:
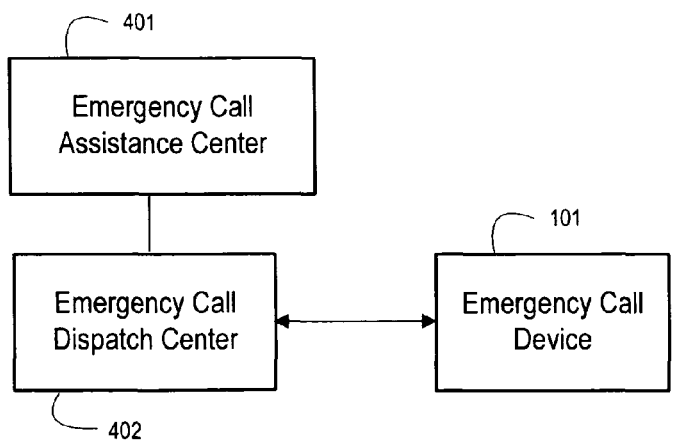
FIG. 8 is a diagram of an emergency call scenario.

FIG. 8 is one type of an emergency call scenario. An emergency call device 101 may be directly coupled with an emergency call dispatch center 402. The emergency call dispatch center 402 may be coupled with an emergency assistance center 401. The emergency call dispatch center 402 may comprise a hospital or emergency room. In alternative systems, the emergency call dispatch center 402 may comprise a provider of vehicle services. An emergency call assistant 704 may establish a connection between the emergency call device 101 and the emergency call dispatch center 402 as in block 207.

FIG. 3 is a flow chart of an alternate emergency call procedure. Some emergency calls may be triggered inadvertently, such as due to a sensor error. Likewise, it may not be necessary to call assistance after a minor accident. In these situations, the emergency call device 101 may display or transmit an audio message that an emergency call is about to begin. The occupant of the vehicle may be notified of the start of an emergency call through countdown in some processes as in block 301. An announcement may be made to the occupant through display 107, speakers 114, tactile feedback, or some combinations. During the countdown (in block 302), an occupant may cancel the emergency call as in block 303. An emergency call cancellation will end the emergency call procedure as in block 304. The timer 104 may be used to time the countdown.

Those processes in which the countdown expires before a cancellation of the emergency call occurs, the emergency information may be transmitted as in block 204. The data may be transmitted through a data connection or a voice connection using an ACP and/or DTMF data format. When a successful transmission of the emergency information occurs as in block 205, the voice connection to the emergency call assistance center 401 may be transferred to an emergency call assistant as in block 206, when the emergency information is not been successfully transmitted, a voice connection to the emergency call dispatch center 402 may be established directly as in block 207.

Figure 4:
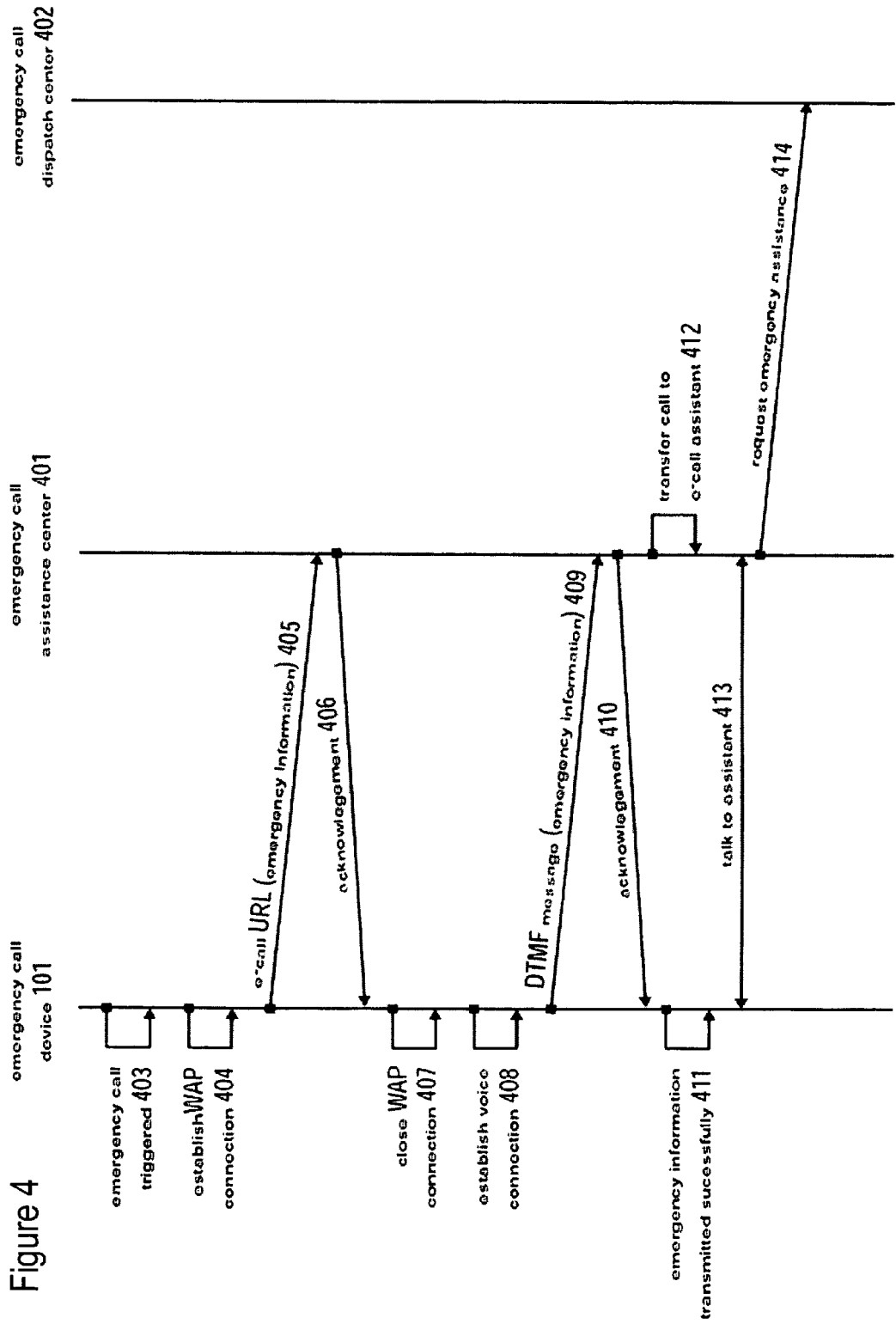
FIG. 4 is a diagram of the tasks performed in an emergency call system.

FIG. 4 shows the processes performed in one emergency call system. When an emergency call is to be placed from the vehicle 403, a WAP connection may be established 404 by the emergency call device 101. When a WAP connection is established, an emergency call URL may be requested 405 and emergency information may be transmitted with the emergency call URL. The emergency information and emergency call URL may be sent to the emergency call assistance center 401.

The emergency call assistance center 401 may acknowledge the receipt of the received information 406. The emergency information sent to the emergency call assistance center 401 may be formatted to the emergency call message protocol established by the application communication protocol (ACP). The emergency information may comprise various data relevant to an emergency call, and may include geographical position of the vehicle, an identification of the assistance requesting device, for example the IMEI of the communication terminal 103 used to transmit the emergency call, a vehicle descriptor, etc., which may be transmitted from the vehicle to the emergency call assistance center 401.

The emergency call assistance center 401 may acknowledge the safe receipt of the emergency call information by sending a reply message 406, such as an emergency call reply message formatted to the emergency call message protocol. After transmitting the emergency information to the emergency call assistance center 401, the emergency call device 101 in the vehicle may close the data connection 407 and establish a voice connection 408 with the emergency call assistance center 401.

The emergency call device 101 may form a new set of emergency information that may be formatted as DTMF messages and may be transmitted 409 to the emergency call assistance center 401 using the established voice connection. The emergency information contained in the DTMF messages and the emergency information in the emergency call URL request using the data connection may include redundant information to ensure a reliable transmission of information to the emergency call assistance center 401 and facilitate synchronization of the received data at the emergency call assistance center 401. The DTMF message may also be acknowledged 410 by the emergency call assistance center 401.

Once the emergency information in the DTMF messages is transmitted, a voice connection may be transferred to an emergency call assistant 412. Using the voice connection, an occupant of the vehicle may interact 413 with an assistant serving his/her emergency call at the emergency call assistance center 401. Upon successfully receiving the emergency call information at the emergency call assistance center 401, the information may be synchronized or supplemented and output either visually or audibly to the assistant serving the emergency call. Based on the received emergency information, the assistant may dispatch the appropriate services 414, such as requesting emergency assistance at an emergency call dispatch center 402, contacting relatives of the injured person(s), querying further information required from the operator of the vehicle via the established voice connection, etc.

In the emergency call procedure, an emergency call may be placed and served by an emergency call assistance center 401 when the occupant of the vehicle is seriously injured and/or it is not possible for him/her to request emergency assistance. The emergency information transmitted using the data connection and the voice connection may facilitate the transmission of emergency calls increasing their reliability and ensuring their immediate processing without necessarily requiring the interaction of an occupant of the vehicle.

Figure 5:
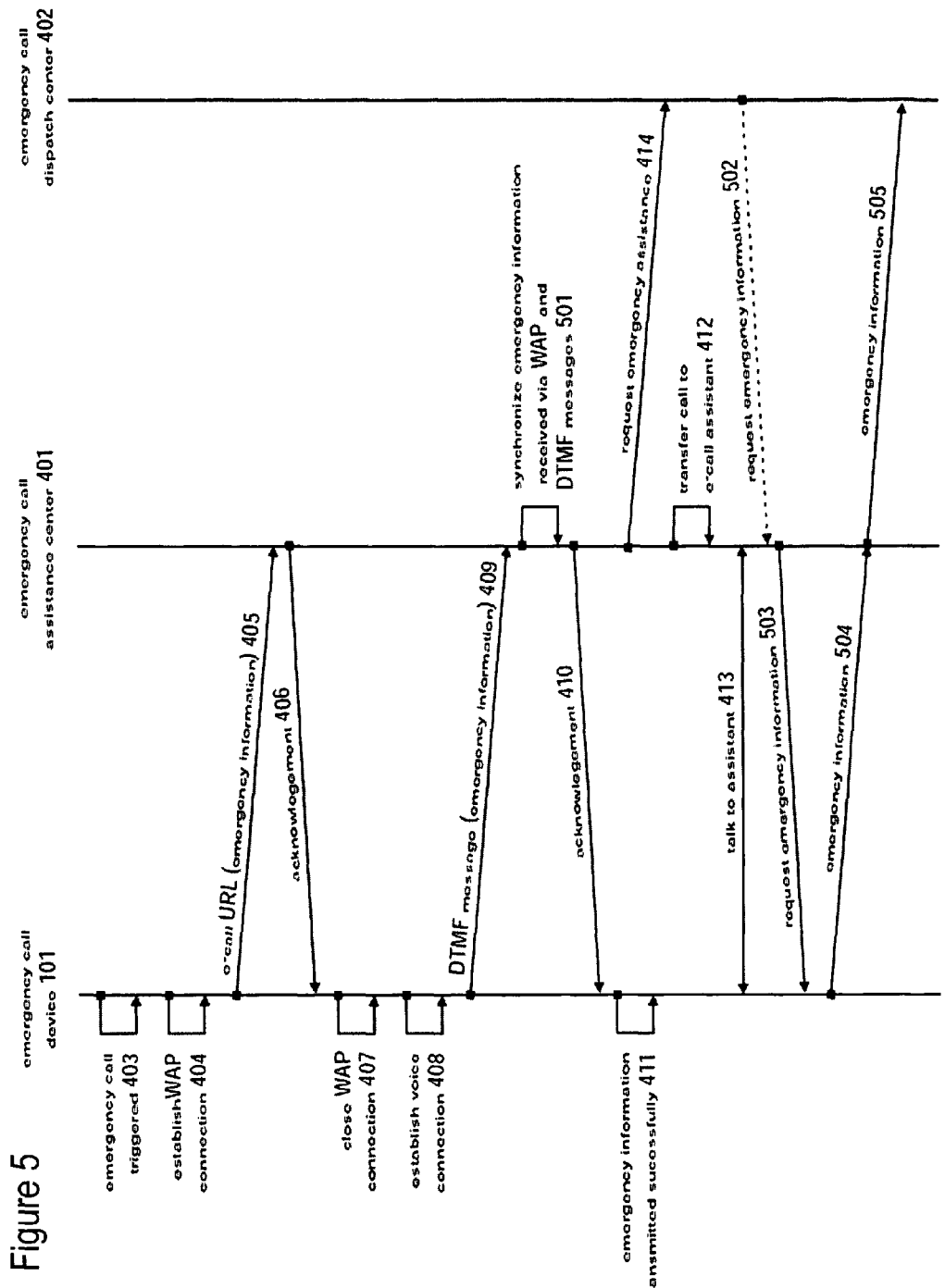
FIG. 5 is a diagram of the tasks performed in an alternate emergency call system.

FIG. 5 shows an alternative message flow and tasks performed in one emergency call system. The emergency call system may comprise an emergency call device 101, an emergency call assistance center 401 and an emergency call dispatch center 402. The emergency call procedure of FIG. 5 may correspond in part to the procedure of FIG. 4.

When an emergency call is triggered in the vehicle 403, a data connection, such as a WAP connection may be established 404 and the emergency information may be transmitted 405 to the emergency call assistance center. The emergency information transmitted using the data connection may be acknowledged 406 by the emergency call assistance center 401. When the data connection 407 is closed, a voice connection to the emergency call assistance center 401 may be established 408. A new set of emergency information may be generated at the vehicle and transmitted 409. The emergency call assistance center 401 may process the emergency information received through the data connection and through the voice connection and synchronize the data 501.

After successful processing of the emergency information at the emergency call assistance center 401, the processed data is sent to an emergency call serving assistant and the safe reception of emergency information may be acknowledged 410. The assistant handling the emergency call at the emergency call assistance center 401 may have dispatched the appropriate services 414 based on the emergency information received and may contact one or several emergency call dispatch centers, such as police, fire or medical assistance. The voice connection to the emergency call assistance center 401 may be transferred to an emergency call assistant 412 when the emergency information is transmitted successfully 411 to the emergency call assistance center 401. In alternate systems, the voice connection may be established to provide relevant information when the information was not transmitted successfully to the emergency call assistance center 401. Another voice connection may be established 414 in order to allow an occupant of the vehicle or the injured person(s) to interact 413 with the emergency call assistance center 401.

In some circumstances, the contacted emergency call dispatch center 402 may request additional emergency information. A request message may be transmitted 502 to the emergency call assistance center 401, which may forward this request 503 for emergency information to the emergency call device 101 in the vehicle. The requested information may be gathered at the vehicle and transmitted through a data or voice connection 504 to the emergency call assistance center 401 and further 505 to the emergency call dispatch center 402.

Alternatively, the requested emergency information may also be transmitted directly to the emergency call dispatch center 402. In the latter case, the emergency call assistance center 401 may include an identification (number) or if a WAP connection is used for data transmission, a response URL may be included such that the emergency call device 101 at the vehicle may transmit the requested emergency information to the emergency call dispatch center 402 directly. The response URL in the message sent to the vehicle may be used to redirect the response to the assistance center's request for emergency information to another entity, e.g. to redirect the response from the vehicle to a serving emergency call dispatch center 402 directly.

In an alternate system, the assistant at the emergency call assistance center 401 may require additional information related to the emergency for further processing the emergency call received from the vehicle and for dispatching the appropriate services. In this case, the emergency call assistance center 401 may request automatic delivery of this required information from the emergency call device 101 serving the emergency call at the vehicle using, for example, a data connection, such as a WAP connection. A request for emergency information may be transmitted from the emergency call assistance center 401 to the emergency call device 503 which may gather the relevant information and automatically transmit requested emergency information 504 back to the emergency call assistance center 401.

The emergency information may then be used by the emergency call assistance center 401 to further request emergency assistance at an emergency call dispatch center 402 or to update later with the requested auxiliary information. The, automatic querying of additional or auxiliary emergency information may be of interest if the occupant of the vehicle transmitting the emergency call has been seriously injured or is incapable of interacting with the assistant directly, for example, due to his/her inability to speak the national language of the country he/she is currently located in.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

We claim:

1. A method for transmitting an emergency call including emergency information using a communication system, the method comprising:
   triggering an emergency call from a vehicle;
   establishing a data connection with an emergency call assistance center through the communication system to handle the emergency call in which the data connection comprises a Wireless Application Protocol (WAP) connection;
   transmitting a first portion of the emergency information to the emergency call assistance center through the data connection as a request for a uniform resource locator (URL) that includes the first portion of the emergency information within the URL request in which the first portion of the emergency information is transmitted in a URL using the WAP data connection;
   establishing a first voice connection to the emergency call assistance center through the communication system;
   transmitting a dual tone multi-frequency (DTMF) message comprising a second portion of the emergency information through the first voice connection such that the first portion of the emergency information transmitted through the data connection and the second portion of the emergency information transmitted through the first voice connection include redundant emergency information; and synchronizing the first portion of the emergency information transmitted through the data connection and the second portion of the emergency information transmitted through the first voice connection at the emergency call assistance center such that errors during transmission may be corrected.

2. The method according to claim 1, further comprising detecting an end of the DTMF message transmitted via the first voice connection at the emergency call assistance center.

3. The method according to claim 1, further comprising:
determining whether the second portion of the emergency information has been received by the emergency call assistance center;
transferring the first voice connection to an. emergency assistant at the emergency call assistance center when the second portion of the emergency information has been received by the emergency call assistance center; and
establishing a second voice connection to an emergency call dispatch center through the communication system when the second portion of the emergency information has not been received by the emergency call assistance center.

4. The method according to claim 1, further comprising initiating a counter, where the emergency call may be cancelled during an emergency call count, and where the emergency call is triggered after the emergency call count reaches a predetermined threshold.

5. The method according to claim 4, where the emergency call count comprises a countdown that is announced audibly.

6. The method according to claim 1, further comprising testing the availability of the communication system, where the testing comprises transmitting at least a portion of the emergency information. over the communication system through a mobile terminal.

7. The method according to claim 1, where at least a portion of the first portion of the emergency information transmitted using the data connection comprises one of a geographical position of the vehicle or an identification number of the vehicle.

8. The method. according to claim 7, where the emergency information further includes one of a timestamp of a generation of the emergency message, a vehicle descriptor, a breakdown status, or additional information and parameters based on an occupant of the vehicle.

9. The method according to claim 7, where the at least a portion of the emergency information comprises a history of information related to a time period that occurs before an emergency, where the history of information tracks a steering of the vehicle, a level of deceleration of the vehicle, or a driving direction of the vehicle.

10. The method according to claim 4, where the emergency call count comprises a countdown that is announced through a display.

11. The method according to claim 1, further comprising synchronizing the portion of emergency information received through the data connection and the first voice connection at the emergency call assistance center; and
transmitting a confirmation for the emergency information received from the emergency call assistance center.

12. The method according to claim 1, further comprising requesting the emergency information from the vehicle through the communication system.

13. The method according to claim 1, further comprising informing at least one emergency call dispatch center of the emergency using the received emergency information.

* * * * *